(12) United States Patent
Tearney et al.

(10) Patent No.: US 10,261,223 B2
(45) Date of Patent: Apr. 16, 2019

(54) SYSTEM AND METHOD FOR FABRICATION OF MINIATURE ENDOSCOPE USING NANOIMPRINT LITHOGRAPHY

(71) Applicants: CANON U.S.A., INC., Melville, NY (US); THE GENERAL HOSPITAL CORPORATION, Boston, MA (US); Guillermo J Tearney, Cambridge, MA (US); Dongkyun Kang, Somerville, MA (US); Mitsuhiro Ikuta, Cambridge, MA (US); George M. Whitesides, Cambridge, MA (US); Ramses V. Martinez, West Lafayette, IN (US)

(72) Inventors: Guillermo J Tearney, Cambridge, MA (US); Dongkyun Kang, Somerville, MA (US); Mitsuhiro Ikuta, Cambridge, MA (US); George M. Whitesides, Cambridge, MA (US); Ramses V. Martinez, West Lafayette, IN (US)

(73) Assignees: Canon USA, Inc., Melville, NY (US); The General Hospital Corporation, Boston, MA (US)

( * ) Notice: Subject to any disclaimer, the term of this patent is extended or adjusted under 35 U.S.C. 154(b) by 213 days.

(21) Appl. No.: 15/115,206

(22) PCT Filed: Jan. 30, 2015

(86) PCT No.: PCT/US2015/013853
§ 371 (c)(1),
(2) Date: Jul. 28, 2016

(87) PCT Pub. No.: WO2015/116974
PCT Pub. Date: Aug. 6, 2015

(65) Prior Publication Data
US 2016/0349417 A1  Dec. 1, 2016

Related U.S. Application Data

(60) Provisional application No. 61/934,421, filed on Jan. 31, 2014.

(51) Int. Cl.
*G02B 5/18* (2006.01)
*B29D 11/00* (2006.01)
(Continued)

(52) U.S. Cl.
CPC ...... *G02B 5/1852* (2013.01); *B29D 11/00769* (2013.01); *G02B 5/1814* (2013.01);
(Continued)

(58) Field of Classification Search
CPC .. G02B 5/1852; G02B 5/1814; G02B 5/1847; G02B 23/2423; G02B 27/4244; G02B 23/2469; B29D 11/00769
See application file for complete search history.

(56) References Cited

U.S. PATENT DOCUMENTS

| 4,637,683 A | 1/1987 | Asawa |
|---|---|---|
| 5,299,272 A | 3/1994 | Buchin |

(Continued)

FOREIGN PATENT DOCUMENTS

| CN | 102879845 A | 1/2013 |
|---|---|---|
| JP | S57208514 A | 12/1982 |

(Continued)

OTHER PUBLICATIONS

Dong, Q., et al., "Soft lithography for micro- and nanoscale patterning", Nature Protocols, Feb. 18, 2010, pp. 491-502, vol. 5, No. 3.

(Continued)

*Primary Examiner* — Mathieu D Vargot
(74) *Attorney, Agent, or Firm* — Canon USA Inc., IP Division

(57) ABSTRACT

Exemplary method and system for providing a diffractive configuration in an optical arrangement are provided. For example, a material can be provided with at least one patterned surface having a very high aspect ratio. The material can be connected with at least one portion of a waveguide arrangement using a pre-polymer adhesive composition. Further, the pre-polymer adhesive composition can be caused to polymerize so as to form the diffractive configuration which at least approximately replicates a structure or at least one feature of the patterned surface.

24 Claims, 6 Drawing Sheets

(51) Int. Cl.
  G02B 23/24 (2006.01)
  G02B 27/42 (2006.01)
  B29K 105/00 (2006.01)
(52) U.S. Cl.
  CPC ....... G02B 5/1847 (2013.01); G02B 23/2423 (2013.01); G02B 23/2469 (2013.01); G02B 27/4244 (2013.01); B29K 2105/0002 (2013.01); B29K 2995/0027 (2013.01)

(56) References Cited

U.S. PATENT DOCUMENTS

| | | | |
|---|---|---|---|
| 6,137,930 A | 10/2000 | Laughlin | |
| 6,341,036 B1 | 1/2002 | Tearney et al. | |
| 6,350,034 B1 | 2/2002 | Fleming et al. | |
| 6,485,413 B1 | 11/2002 | Boppart et al. | |
| 6,657,723 B2 | 12/2003 | Cohen et al. | |
| 7,050,674 B2 | 5/2006 | Lee et al. | |
| 7,429,437 B2 | 9/2008 | Rich et al. | |
| 7,501,035 B2 | 5/2009 | Tateno | |
| 7,531,465 B2 | 5/2009 | Cho et al. | |
| 7,764,374 B2 | 7/2010 | Hübner et al. | |
| 7,796,270 B2 | 9/2010 | Yelin et al. | |
| 7,843,572 B2 | 11/2010 | Tearney et al. | |
| 8,092,701 B2 | 1/2012 | Nagano et al. | |
| 8,145,018 B2 | 3/2012 | Shishkov et al. | |
| 8,541,778 B2 | 9/2013 | Seki et al. | |
| 8,557,941 B2 | 10/2013 | Shustack et al. | |
| 9,415,550 B2* | 8/2016 | Tearney | B29D 11/00769 |
| 2003/0016449 A1 | 1/2003 | Fabiny et al. | |
| 2003/0062638 A1 | 4/2003 | Dhar | |
| 2004/0109642 A1* | 6/2004 | Parikka | G02B 6/1221 385/37 |
| 2006/0157444 A1 | 7/2006 | Nakamura et al. | |
| 2007/0267764 A1* | 11/2007 | Morimoto | B29D 11/00 264/1.1 |
| 2008/0013960 A1 | 1/2008 | Tearney et al. | |
| 2008/0020480 A1 | 1/2008 | Lin et al. | |
| 2008/0097225 A1 | 4/2008 | Tearney et al. | |
| 2009/0047478 A1 | 2/2009 | Zhang et al. | |
| 2009/0134793 A1 | 5/2009 | Cseh et al. | |
| 2011/0221095 A1* | 9/2011 | Sreenivasan | B81C 1/0046 264/293 |
| 2011/0237892 A1 | 9/2011 | Tearney et al. | |
| 2011/0275899 A1 | 11/2011 | Tearney et al. | |
| 2013/0107367 A1 | 5/2013 | Zhu et al. | |

FOREIGN PATENT DOCUMENTS

| | | |
|---|---|---|
| JP | 2002365417 A | 12/2002 |
| JP | 2006-165371 A | 2/2006 |
| JP | 2006-310678 A | 11/2006 |
| JP | 2007-144995 A | 6/2007 |
| JP | 2011-170224 A | 9/2011 |
| JP | 2011-527930 A | 11/2011 |
| WO | 2007089073 A1 | 8/2007 |
| WO | 2011/111409 A1 | 9/2011 |
| WO | 2013145850 A1 | 3/2013 |
| WO | 20130064843 A1 | 5/2013 |
| WO | 2013158543 A1 | 10/2013 |
| WO | 2014031748 A1 | 2/2014 |

OTHER PUBLICATIONS

Jackman, R.J., et al., "Fabricating Large Arrays of Microwells with Arbitrary Dimensions and Filling Them Using Discontinuous Dewetting", Analytical Chemistry, Jun. 1, 1998, vol. 70, No. 11, p. 2280-2287.

* cited by examiner

SYSTEM AND METHOD FOR FABRICATION OF MINIATURE ENDOSCOPE USING NANOIMPRINT LITHOGRAPHY

CROSS-REFERENCE TO RELATED APPLICATION(S)

This application is a national stage application of PCT/US15/13853 filed 30 Jan. 2015 and claims priority to U.S. Provisional Application Ser. No. 61/934,421 (System and method for fabrication of miniature endoscope using nanoimprint lithography), filed Jan. 31, 2014, the content of each of which are incorporated herein by reference in its entirety This application relates to U.S. Provisional Patent Application Ser. No. 61/934,486 (Optical probe, light intensity detection, imaging method and system for forward-view imaging) filed Jan. 31, 2014 and U.S. Provisional Application Ser. No. 61/934,464 (Apparatus and methods for color endoscopy) filed Jan. 31, 2014, the entire contents of such disclosures are incorporated herein by reference.

FIELD OF THE DISCLOSURE

The present disclosure relates generally to a fabrication of miniature microscopes, including exemplary systems, and methods for fabrication of miniature endoscopes using nanoimprint, and including those for minimally-invasive imaging and image-guided therapy.

BACKGROUND INFORMATION

Spectrally encoded endoscopy ("SEE") is a miniature endoscopy technology that can conduct high-definition imaging through a sub-mm diameter probe. With SEE, broadband light is diffracted by a grating at the tip of the fiber, producing a dispersed spectrum on the sample. Light returned from the sample is detected using a spectrometer; and each resolvable wavelength corresponds to reflectance from a different point on the sample. Previously, SEE procedures have been demonstrated using a 350 µm diameter probe, which produced high-quality images in two- and three-dimensions. One of the technical challenges for fabricating SEE probes has been to make a sub-mm transmission grating with a high diffraction efficiency and to precisely assemble the miniature grating with other optical components in the probe.

In International Publication WO2014/031748, a method for fabricating or otherwise providing miniature gratings for SEE probes using, e.g., "soft" lithography was described. In this exemplary method, an elastomeric stamp with a grating pattern is first fabricated by replica molding of the master grating. The miniature grating then is fabricated by replica molding of the elastomeric stamp. This approach, however, has challenges in fabricating the elastomeric stamp when the aspect ratio of the grating pattern is very high. Soft material does not provide enough stiffness to replicate the grating pattern, while hard material cannot be easily removed from the master grating due to the friction between the hard elastomeric stamp and master grating.

Thus, there is a need to improve or at least partially address the above-described deficiencies and/or issues associated with the SEE probe fabrication of SEE probes.

SUMMARY OF EXEMPLARY EMBODIMENTS

Thus, to that end, exemplary variants of systems, and methods for the fabrication of miniature endoscopes, including those using nanoimprint technology according to various exemplary embodiments of the present disclosure, are provided herein. According to some present exemplary embodiments, methods, systems, and computer accessible mediums are provided for fabricating SEE probes using nanoimprint lithography, including a fabrication of miniature diffraction gratings on SEE imaging optics.

According to an exemplary embodiment according to present disclosure, the miniature grating can be provided by first making a rigid grating master pattern, functionalizing the pattern surface of it, and then replicating the grating pattern on the miniature imaging lens. In an embodiment, a grating master is designed with the reverse pattern to the pattern which the grating on the probe will have. In one embodiment, the smallest diameter of the grating fabricated by this method may only be limited by the smallest size of the imaging lens, enabling the fabrication of ultraminiature SEE probes, including those, for example, less than 0.1 mm in diameter. In an exemplary embodiment, the miniature gratings can be fabricated with, for example, UV curing epoxy, polyurethanes, or other low-cost polymers, and can thus make the devices less expensive to manufacture than typical SEE probes. In addition, a method according to an exemplary embodiment of the present disclosure does not require an intermediate mold, such as an elastomeric stamp that is typically used with soft-lithography methods. This exemplary method can apply to a high groove-density master grating which has high groove aspect ratio, where it may not be easy to fabricate an elastomeric stamp therefrom.

Thus, according to certain exemplary embodiments of the present disclosure, methods and systems for providing a diffractive configuration in an optical arrangement can be provided. In one exemplary embodiment, a rigid material can be provided with at least one patterned surface. The patterned surface can be functionalized by chemical material after the pattern is formed. In an embodiment, the surface of the rigid mold can be connected with at least one portion of a waveguide arrangement using, for example, a pre-polymer adhesive composition. Thus, a patterned surface can be formed on the tip of a waveguide arrangement and, for example, for a diffraction grating at this location. The waveguide arrangement may, for example, include an optical fiber and a focusing lens. The waveguide arrangement typically includes an optical fiber and a focusing lens. In one exemplary embodiment, a pre-polymer adhesive composition can be made to polymerize so as to form a diffractive configuration. In another exemplary embodiment, the diffractive configuration approximately replicates a structure or at least one feature of the glass material.

The diffractive configuration can be a grating according to an exemplary embodiment. In another exemplary embodiment, the glass material can be removed from the optical arrangement. The optical arrangement can comprise at least one lens in optical communication with the diffractive configuration. The pre-polymer adhesive composition can be polymerized by applying at least one electro-magnetic radiation to the pre-polymer adhesive composition to be polymerized. According to an exemplary embodiment of the present disclosure, the electro-magnetic radiation can be provided via a waveguide arrangement. In a further exemplary embodiment, the glass material is transparent to at least one wavelength in the visible spectrum. The rigid material can be transparent to the wavelength of the electro-magnetic radiation provided by the waveguide arrangement. In another exemplary embodiment, the pre-polymer adhesive composition can have a refractive index of between about 1.3 and 1.7. According to still another exemplary embodiment, the diffractive configuration can have a diameter or a cross-section that is smaller than about 1 mm. In an embodiment, the grating has (i) a groove density that is larger than about 2000 lines per mm and/or (ii) a groove aspect ratio that is larger than 3, 4, 5, 6, or 7. The grating can have diffraction efficiency that is larger than 30%. The diffractive configuration can include at least one lens element. The exemplary optical arrangement can include a GRIN lens.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

Further objects, features and advantages of the present disclosure will become apparent from the following detailed description taken in conjunction with the accompanying figures showing illustrative embodiments of the present disclosure, in which.

Figure 1:
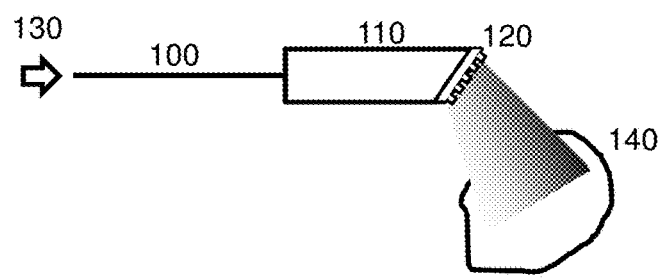
FIG. 1 is a schematic diagram of an exemplary SEE probe according to an exemplary embodiment of the present disclosure, fabricated by an exemplary method according to an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure as defined by the appended claims.

DETAILED DESCRIPTION OF EXEMPLARY EMBODIMENTS

A schematic diagram of the SEE probe is shown in FIG. 1 according to an exemplary embodiment of the present disclosure. This exemplary SEE probe can include an optical fiber 100, a focusing lens 110, and a diffraction grating 120. As shown in FIG. 1, a broadband light or a UV light 130 can be dispersed along a transverse aspect of the sample 140. Other electro-magnetic radiations can be provided in another exemplary embodiment.

Figure 2:
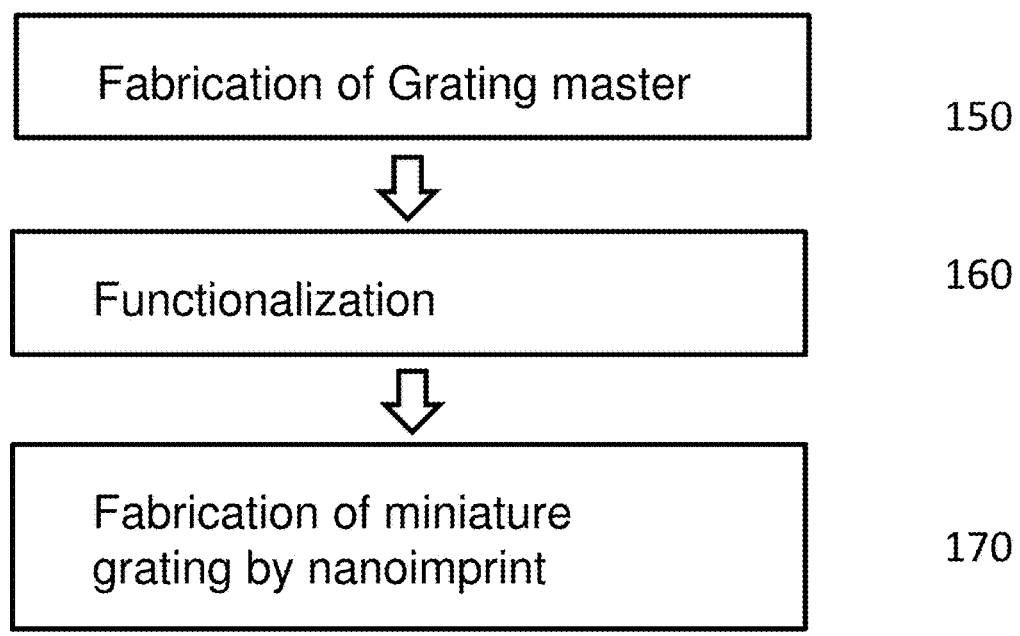
FIG. 2 is a flow diagram of an exemplary grating fabrication method according to an exemplary embodiment of the present disclosure.

In one exemplary embodiment of the present disclosure, the diffraction grating 120 can be fabricated as shown in the block diagram of a process of FIG. 2. In this exemplary process of FIG. 2, a master with a grating pattern can be fabricated (provided in procedure 150). The grating master can be made by various methods, including, e.g., electron-beam lithography, photo-lithography, interference lithography, nanoembossing, nanoimprint, or dry etching such as reactive ion etching. The exemplary geometry of the grating master can be determined by, e.g., a numerical simulation, to provide high diffraction efficiency at the working spectrum. For example, for the working spectrum of 415-820 nm and the groove density of 2000 lines/mm, the numerical simulation can derive parameters such as the groove width of 165 nm and the groove depth of 0.9 μm, which provides a diffraction efficiency of 36% when the refractive index of the final grating material is about 1.64. The grating master can be an etched fused silica grating. The final grating can be made by replica molding of the grating master (procedure 170). The grating master is designed as it has the reverse pattern to the pattern which the final grating on the probe should have; for example, if the final grating should have the groove density of 2000 lines/mm (i.e. the pitch of 500 nm) and the groove width of 165 nm, the grating master should have the groove density of 2000 lines/mm and the groove width of 335 nm.

The groove density for the grating master is preferably designed so that a sufficient FOV is obtained for the working spectrum. Typically the groove density is between 500-4000 lines/mm. The groove depth and duty cycle (groove width/groove pitch) of the grating master can be optimized in terms of diffraction efficiency of the polymer grating to be fabricated.

Figure 3:
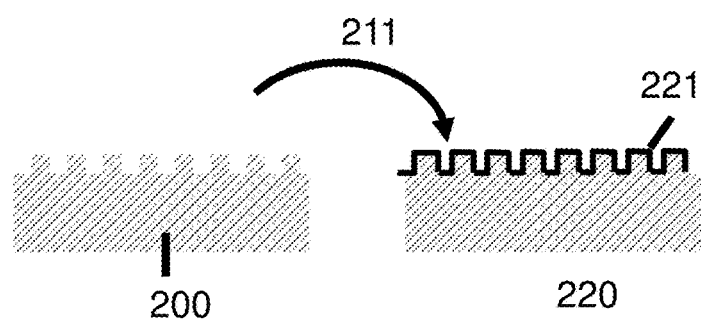
FIG. 3 is a diagram for an exemplary method of functionalizing a glass grating.

According to the exemplary embodiment, the patterned surface of the etched grating 200 can be functionalized after the pattern with thin layer of some chemical material 221 as shown in FIG. 3 (provided in procedure 160 of FIG. 2) so that such material 221 can prevent the final grating material from sticking to the functionalized grating master 220. As an example of the functionalization 211 (also see procedure 160 of FIG. 2), the surface of the etched grating 200 can be coated with a monolayer of TFOCS (Tridecafluoro-1,1,2,2-tetrahydrooctyl-1-trichlorosilane).

Figure 4:
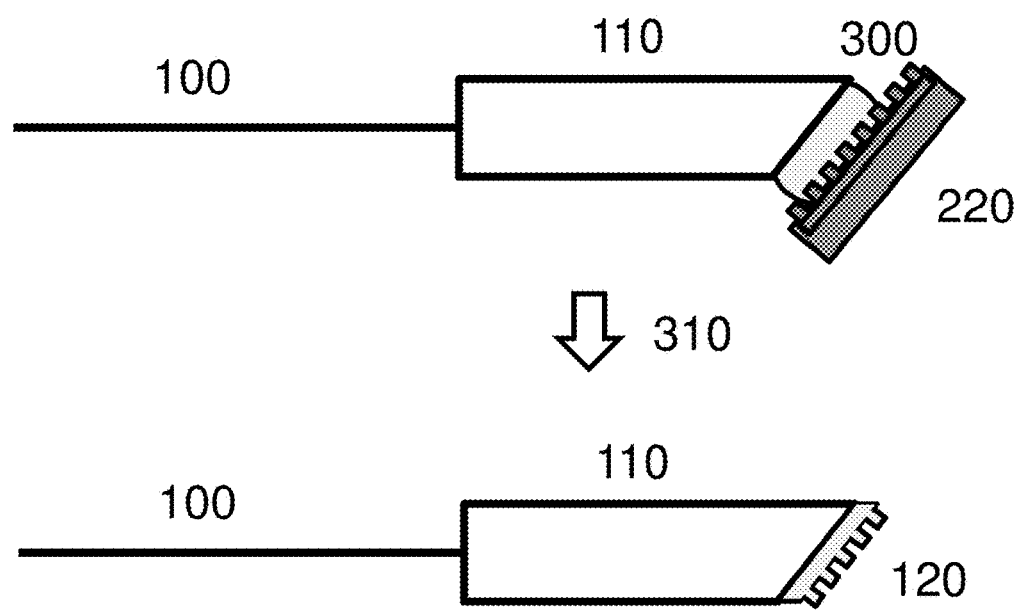
FIG. 4 is a diagram of an exemplary grating fabrication process according to an exemplary embodiment of the present disclosure.

FIG. 4 shows an exemplary illustration of a process for fabricating a miniature grating at the tip of the SEE probe optics, according to an exemplary embodiment of the present disclosure. For example, a prepolymer 300 can be placed at a tip of the focusing lens 110. The functionalized grating master 220 can be provided such that it can come into contact with a prepolymer 300. The prepolymer 300 can be polymerized (procedure 310) to complete the miniature grating 120. The functionalized grating master 220 can be removed once the miniature grating is completed. The prepolymer 300 can be cured by heat, moisture, and/or electromagnetic radiation. The refractive index of the miniature grating 120 in conjunction with the grating geometry determines the diffraction efficiency. Therefore, the prepolymer 300 should to be selected so that the refractive index of the miniature grating 120 can be substantially or approximately close to or match the design refractive index that provides a high diffraction efficiency.

Figure 5:
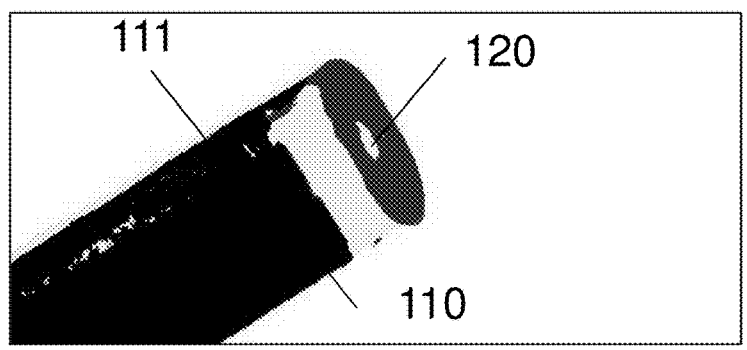
FIG. 5 is an exemplary microscopy photographs of an exemplary SEE probe according to an exemplary embodiment of the present disclosure.

FIG. 5 depicts an exemplary highly magnified photograph of the tip of an exemplary SEE probe fabricated by the method according to an exemplary embodiment of the present disclosure. As shown in FIG. 5, the miniature grating 120 has the groove density of 2000 lines/mm and groove depth of about 900 nm. The central elliptical region at the distal tip of the SEE probe is red, green or blue, respectively, as the grating formed at the probe's tip diffracts the illumination light or other electro-magnetic radiation of the microscope system and preferentially directs the red, green, or blue light to the microscope camera at each viewing angle.

Figure 6:
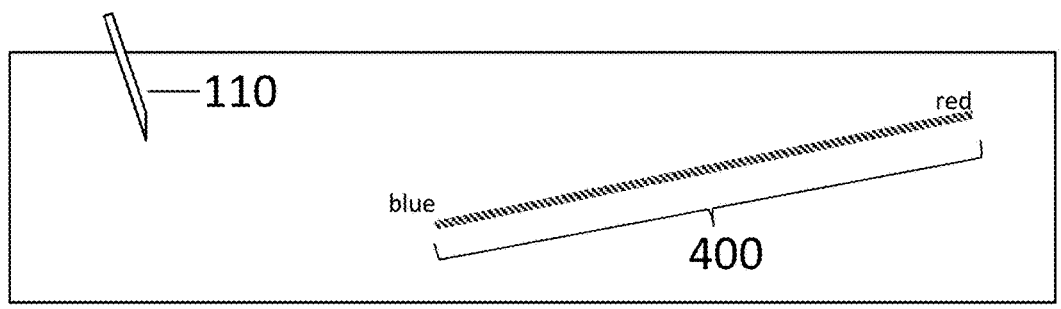
FIG. 6 is an exemplary diagram of the spectrally-encoded illumination by an exemplary SEE probe according to an exemplary embodiment of the present disclosure.

A diffraction performance of the exemplary miniature grating 120 shown in FIG. 1 was tested. The exemplary SEE probe generated the spectrally-encoded illumination pattern 400, which appears as a linear rainbow (see exemplary image of FIG. 6).

One of the advantages of fabrication according to an exemplary embodiment of the present disclosure is that the exemplary SEE probes can be made at a relatively reduced cost. For example, a grating master can be made according to present embodiments with, for example, an effective grating area=15 mm by 15 mm, which can be used to fabricate approximately 225 miniature gratings where a 1 mm by 1 mm area of the stamp is used for fabricating an approximately 500-μm-diameter grating. The functionalized grating 220 can be used multiple times without additional functionalizing processes. If the chemical layer 221 is determined to be worn off, the grating master can be functionalized again multiple times. Thus, a single grating master according to an exemplary embodiment can be used to make numerous SEE probes, which can reduce the fabrication cost of the device. The low cost makes it possible to fabricate cheap and disposable SEE probes, which can facilitate the clinical use of this technology.

A fabrication method according to an exemplary embodiment of the present disclosure can form a miniature grating on the imaging optics as a finishing step to the optical assembly. For example, when the exemplary grating is not properly formed during the fabrication process or is damaged during the use, the tip of the SEE probe can be polished by a very small amount ~20 μm) to remove the damaged grating. Following this exemplary corrective action, a new grating can then be fabricated according to present inventive concepts on the same imaging optics. Thus, an exemplary procedure for handling and precisely aligning the miniature grating is not needed using the exemplary procedures described herein, which can help make the fabrication process easier than would a method requiring an alignment.

Another advantage of fabrication methods according to embodiments of the present disclosure can provide that SEE probe sizes can be decreased further than many previously manufactured probes. For example, an ultraminiature GRIN lens with a diameter of about 80 μm has been recently being developed by GRINtech. A method according to an exemplary embodiment of the present disclosure can be used to make a grating at the tip of the 80-μm GRIN lens, which can make it possible to consider an ultraminiature SEE probe with a diameter that is smaller than 100 μm. For example, the small diameter of the ultraminiature SEE probe can facilitate imaging of the internal tissues that are not currently accessible by conventional endoscopic imaging devices, including difficult to navigate areas of vessels, sinuses, the brain, and other areas.

An exemplary advantage of the fabrication methods according to various embodiments of the present disclosure are that these exemplary procedures do not require the use of any intermediate mold, such as an elastomeric grating that is used in a soft-lithography method. According to certain exemplary embodiments of the present disclosure, it is possible to utilize a high groove-density master grating which has high groove aspect ratio. For example, according to one exemplary embodiment, it is possible to use an aspect ratio of more than about 5, where it would be difficult to fabricate an elastomeric grating with such features.

Figure 7:
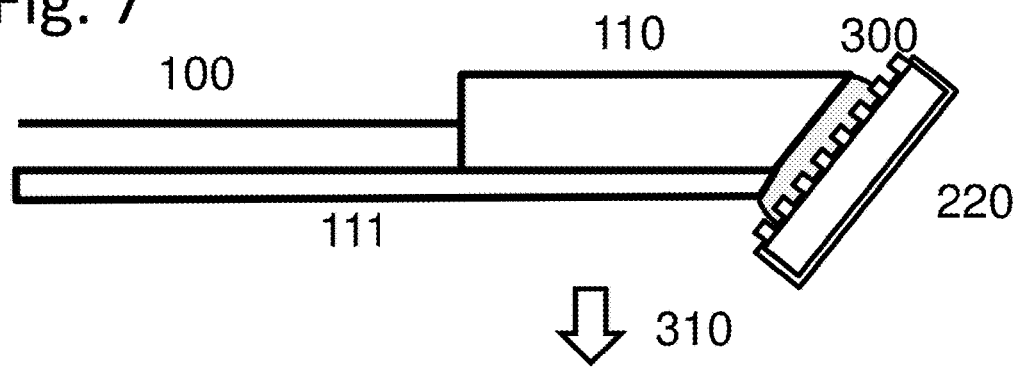
FIG. 7 is a set of diagrams of an exemplary SEE probe that has more than one optical component at the distal end according to an exemplary embodiment of the present disclosure.
Figure 7:
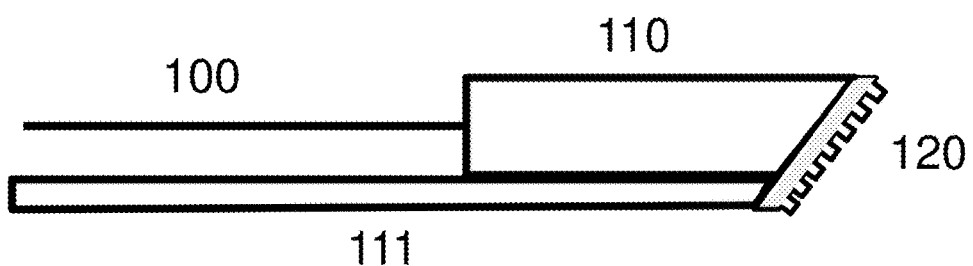

FIG. 7 shows a set of diagrams of the exemplary SEE probe according to an exemplary embodiment of the present disclosure. In this exemplary embodiment, the distal optics has more than one optical component. For example, light and/or other electro-magnetic radiation from the fiber 100 can be focused by the focusing lens 110, and light and/or other electro-magnetic radiation from the sample can be collected by an additional fiber, e.g., the detection fiber 111. The focusing lens no and the detection fiber 111 can be assembled before the fabrication of the grating. Then, the prepolymer 300 can be or include both the focusing lens 110 and the detection fiber 111, and cured at procedure 310 to complete the miniature grating 120. The exemplary method described herein can be used for any imaging optics of a range of designs, regardless of the number and dimension of the optical components used.

For example, the rigid mold can be substantially transparent to both UV and visible radiation. If the mold is transparent at least in one wavelength in visible (400-800 nm), that enables the polymer to be seen through the mold during the curing process by an optical instrument, such as a stereo microscope. If the mold is transparent at least in one wavelength in UV (100-400 nm), it is then possible to cure polymer through the mold by using UV light, which can provide a more uniformly cured polymer. Thus, the mold can have at least 70% transmission of light at least one wavelength from 400 nm to 800 nm. In some exemplary embodiments, the rigid mold has at least 70% transmission at least one wavelength from 100 nm to 400 nm, and/or has at least 70% transmission in at least one wavelength from the range of 400 nm to 800 nm. In further exemplary embodiments, the rigid mold has at least 90% transmission at least one wavelength from 400 nm to 800 nm. In still further exemplary embodiments, the rigid mold is substantially transparent to visible radiation with, on average, at least 70% transmission of light from 400 nm to 800 nm. In other exemplary embodiments, substantially transparent means at least 70%, 80%, or at least 90% transparent over the wavelength range described.

According to exemplary embodiments of the present disclosure, the rigid mold can be made from a glass such as fused silica BK7, SF11, or F2. In other exemplary embodiments, the rigid mold can be made from crystal, such as sapphire. In other exemplary embodiments, the rigid mold can be made from a rigid plastic optical materials, such as an acrylic (e.g., PMMA) or a polycarbonate. The rigid mold can be also made with heat curable or UV curable epoxies. For example, the mold can have a sufficient rigidity to maintain the grating features during grating fabrication. Thus, for example, a glass mold can be used to maintain the aspect ratio of at least 3, at least 4, or at least 5.

Figure 8:
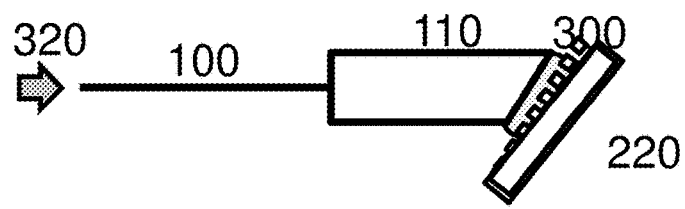
FIGS. 8A and 8B are a set of diagrams of exemplary procedure(s) for polymerizing UV-curable prepolymer according to an exemplary embodiment of the present disclosure.
Figure 8:
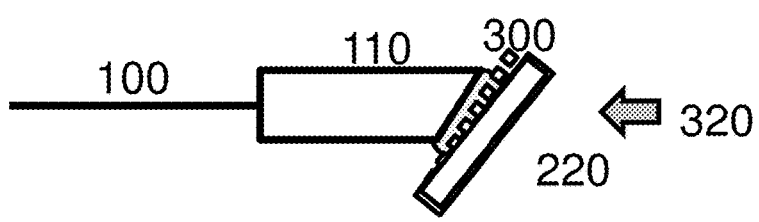

According to another exemplary embodiment of the SEE probe of the present disclosure, the prepolymer can be UV-curable prepolymer. The UV-curable prepolymer can be cured by various approaches, including those as shown in the exemplary diagrams of FIGS. 8A and 8B. For example, as illustrated in FIG. 8A, the UV light 130 (or other electro-magnetic radiation) can be provided and/or coupled to the fiber 100. In this exemplary embodiment, the area of the prepolymer 300 that is polymerized can be confined to the size of, e.g., the probe diameter. When the coupling efficiency of the UV curing light 320 into the fiber 100 is low, the curing time can become somewhat long. In FIG. 8B, the UV light 320 (or other electro-magnetic radiation) can be delivered from the back side of the grating master 220. In this exemplary embodiment, the curing can be conducted quickly. If the prepolymer spreads to an area that is bigger than the probe diameter, the size of the miniature grating can be bigger than the probe diameter.

Figure 9:
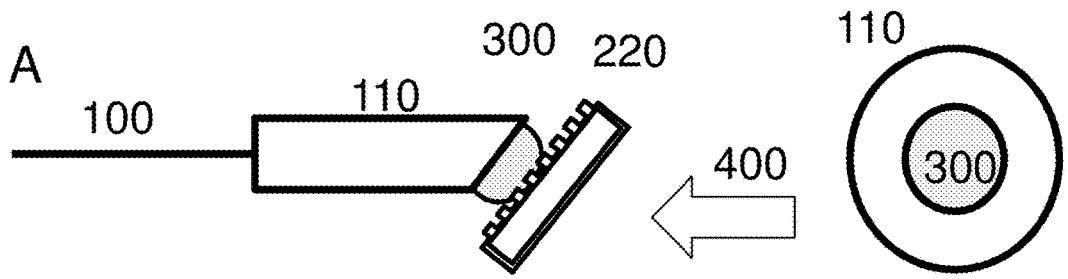
FIGS. 9A and 9B are a set of diagrams of exemplary procedure(s) for adjusting the distance between the SEE probe optics and the grating master according to an exemplary embodiment of the present disclosure.
Figure 9:
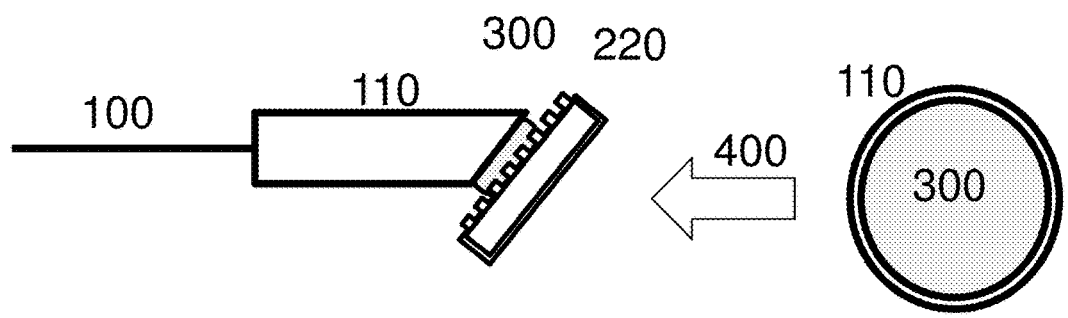
Figure 10:
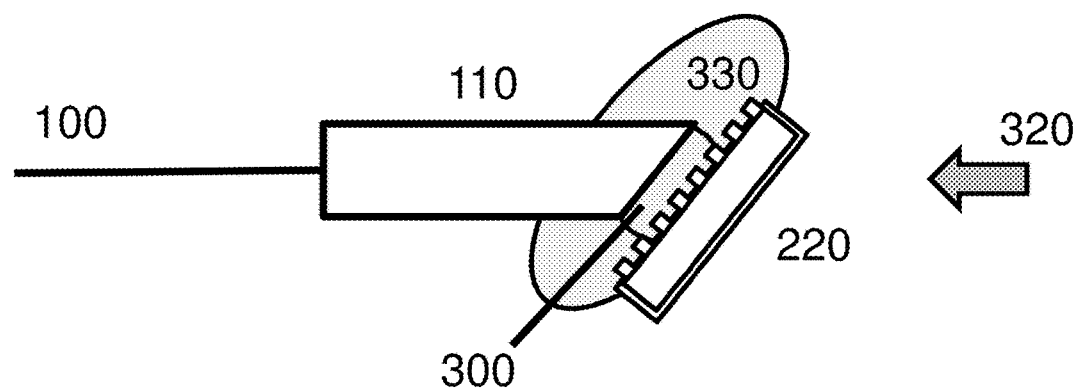
FIG. 10 is a diagram of an exemplary procedure for polymerizing UV-curable prepolymer under nitrogen-rich environment according to an exemplary embodiment of the present disclosure.

FIGS. 9A and 9B illustrates a set of diagrams of exemplary procedure(s) according to an exemplary embodiment of the present disclosure that further optimizes a miniature grating profile. Profile of the prepolymer 300 can be observed using, e.g., a stereo microscope that looks at the prepolymer from the backside of the grating master 220. As shown in FIG. 9A, if the distance between the SEE optics 110 and grating master 220 is larger than the optimal distance, for example, the prepolymer 300 can generate a profile that is smaller than the size of the SEE probe optics 110. Based on this exemplary information, the grating master or the SEE optics can be translated so that the distance between the grating master and SEE optics decrease. When the distance is optimized, as shown in FIG. 9B, the prepolymer can have a diameter that is very close to the diameter of the SEE optics. In another exemplary embodiment of the SEE probe according to the present disclosure as shown in FIG. 10, the curing can be conducted under nitrogen-rich environment. For example, nitrogen 330 can be provided to the surrounding area of the prepolymer 300. The nitrogen can prevent the contact between oxygen and the prepolymer 300, which can improve the quality of the miniature grating.

In another exemplary embodiment of the present disclosure, the exemplary grating fabrication method can be precisely performed using a computer. For example, a motorized translation stage can be used to move the rigid mold in three-dimensions. Relative location of the rigid mold to the distal optics can be precisely controlled by the translation stage, which can be controlled by the computer. The rigid mold can be aligned relative to the distal optics, Additionally, the profile of the pre-polymer adhesive (such as an epoxy) can be monitored by a microscopy camera, which can be located behind the rigid mold in embodiments where the rigid mold is transparent to at least one wavelength for such visualization. The camera can be connected to a computer or a set of computers, which can be specifically programmed and/or configured to effect the movement of the rigid mold until an optimal profile is achieved. This exemplary profile should be is similar to the profile of the distal optics. The computer can have an automated alignment algorithm, where the translation is automatically moved based on the image feedback from the microscopy camera.

It is noted that the exemplary embodiments of the present disclosure that can be used for making and/or fabrication of probes and diffraction grating fabrication can comprise any processes and/or procedures described herein, in any order, using any modality as described herein or understood by those having ordinary skill in the art.

The foregoing merely illustrates the principles of the present disclosure. Various modifications and alterations to the described embodiments will be apparent to those skilled in the art in view of the teachings herein. Indeed, the arrangements, systems and methods according to the exemplary embodiments of the present disclosure can be used with any SEE system or other imaging systems, and for example with those described in U.S. Pat. Nos. 7,843,572, 8,145,018, 6,341,036, 7,796,270 and U.S. Patent Application Nos. 2008/0013960 and 2011/0237892, the disclosures of which are incorporated by reference herein in their entireties. It will thus be appreciated that those skilled in the art will be able to devise numerous systems, arrangements and methods which, although not explicitly shown or described herein, embody the principles of the present disclosure and are thus within the spirit and scope of the present disclosure. In addition, to the extent that the prior art knowledge has not been explicitly incorporated by reference herein above, it is explicitly being incorporated herein in its entirety. All publications referenced herein above are incorporated herein by reference in their entireties.

What is claimed is:

1. A method for providing a diffractive configuration in an optical probe, comprising:
   providing a rigid mold with at least one patterned surface;
   connecting the rigid mold with at least one portion of the optical probe using a pre-polymer adhesive composition; and
   causing the pre-polymer adhesive composition to polymerize so as to form the diffractive configuration which at least approximately replicates, on the distal end of the optical probe, a structure or at least one feature of the rigid mold.

2. The method according to claim 1, further comprising forming the rigid mold by dry etching.

3. The method according to claim 1, wherein the diffractive configuration is a grating.

4. The method according to claim 1, further comprising removing the rigid mold from the optical probe after the pre-polymer adhesive composition has polymerized to form the diffractive configuration.

5. The method according to claim 1, wherein the optical probe comprises at least one lens, and wherein the method includes depositing the pre-polymer adhesive composition on either the rigid mold or the at least one lens, such that the at least one lens is in optical communication with the diffractive configuration.

6. The method according to claim 1, wherein the rigid mold has a composition that is substantially transparent to ultraviolet and visible radiation.

7. The method according to claim 1, wherein the causing procedure includes applying at least one electro-magnetic radiation to the pre-polymer adhesive composition to be polymerized.

8. The method according to claim 7, wherein the at least one electro-magnetic radiation is provided via one of the optical probe and the rigid mold.

9. The method according to claim 1, wherein the pre-polymer adhesive composition has a refractive index of between 1.3 and 1.7.

10. The method according to claim 1, wherein the diffractive configuration formed at the distal end of the optical probe has a diameter or a cross-section that is smaller than 1 mm.

11. The method according to claim 3, wherein the grating has a groove density that is larger than 1000 lines per mm.

12. The method according to claim 3, wherein the grating has a groove aspect ratio that is larger than 5.

13. The method according to claim 3, wherein the grating has diffraction efficiency that is larger than 70%.

14. The method according to claim 1, wherein the diffractive configuration has at least one lens element.

15. The method according to claim 1, wherein the optical probe includes an optical fiber and a GRIN lens, and wherein the causing includes forming the diffractive configuration on a distal end of the GRIN lens.

16. A system for providing a diffractive configuration on an optical probe, comprising:
a rigid mold with at least one patterned surface;
an optical probe having a proximal end and a distal end; and
a controller configured to:
connect the rigid mold with at least one portion of the optical probe using a pre-polymer adhesive composition; and
cause the pre-polymer adhesive composition to polymerize so as to form the diffractive configuration which at least approximately replicates, on the distal end of the optical probe, a structure or at least one feature of the rigid mold.

17. The system according to claim 16, wherein the controller is further configured to remove the rigid mold from the optical probe.

18. The system according to claim 16, wherein the optical probe comprises an optical fiber and at least one lens in optical communication with the diffractive configuration.

19. The system according to claim 16, wherein the pre-polymer adhesive composition has a refractive index of between 1.3 and 1.7.

20. The system according to claim 16, wherein the diffractive configuration has a diameter or a cross-section that is smaller than 1 mm.

21. The system of claim 16, wherein the rigid mold is a fused silica grating master and wherein the diffractive configuration is a grating made by replica molding of the grating master.

22. The system of claim 16, wherein the rigid mold is made of a material chosen from the group consisting of glass, crystal, and rigid plastic.

23. The system of claim 16, wherein the rigid mold is a glass grating master having an aspect ratio of at least 3, at least 4, or at least 5.

24. The system of claim 16, wherein the optical probe is a spectrally encoded endoscopy (SEE) probe, and the diffractive configuration is formed on the distal end of the SEE probe, whereby the SEE probe is configured to irradiate a sample with a spectrally-encoded illumination pattern.

* * * * *